United States Patent
Baek

(10) Patent No.: US 9,831,679 B2
(45) Date of Patent: Nov. 28, 2017

(54) POWER TRANSMISSION APPARATUSES

(71) Applicant: Samsung Electronics Co., Ltd., Suwon-Si, Gyeonggi-Do (KR)

(72) Inventor: Jei-hoon Baek, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 500 days.

(21) Appl. No.: 13/867,373

(22) Filed: Apr. 22, 2013

(65) Prior Publication Data

US 2014/0132067 A1 May 15, 2014

(30) Foreign Application Priority Data

Nov. 14, 2012 (KR) .................. 10-2012-0129096

(51) Int. Cl.
| | | |
|---|---|---|
| H02J 4/00 | (2006.01) | |
| H02J 5/00 | (2016.01) | |
| H02J 7/02 | (2016.01) | |
| H02J 7/00 | (2006.01) | |

(52) U.S. Cl.
CPC ............ *H02J 4/00* (2013.01); *H02J 5/005* (2013.01); *H02J 7/02* (2013.01); *H02J 7/025* (2013.01); *H02J 7/0068* (2013.01); *Y10T 307/344* (2015.04)

(58) Field of Classification Search
CPC ................ H02J 1/10; H02J 7/14; H02J 7/00
USPC ..................... 307/23; 320/104, 109
See application file for complete search history.

(56) References Cited

U.S. PATENT DOCUMENTS

| | | | |
|---|---|---|---|
| 8,008,888 B2* | 8/2011 | Oyobe | B60L 5/005 320/104 |
| 8,469,122 B2* | 6/2013 | Perlman | B60L 11/1816 180/168 |
| 8,478,469 B2* | 7/2013 | Ueo | B60L 3/003 701/22 |
| 2008/0094013 A1* | 4/2008 | Su | B60L 11/1811 318/139 |
| 2011/0018360 A1* | 1/2011 | Baarman | H02J 5/005 307/104 |

(Continued)

FOREIGN PATENT DOCUMENTS

| | | |
|---|---|---|
| JP | 2011139566 A | 7/2011 |
| KR | 20100047314 A | 5/2010 |

(Continued)

*Primary Examiner* — Rexford Barnie
*Assistant Examiner* — Joseph Inge
(74) *Attorney, Agent, or Firm* — Harness, Dickey & Pierce, P.L.C.

(57) ABSTRACT

A power transmission apparatus may comprise: a motor/generator unit configured to drive a motor with three-phase alternating current (AC) power converted from a supplied AC power or generating electrical power to supply AC power; a battery unit configured to charge electrical energy with direct current (DC) power and supplying the DC power by using the charged electrical energy; and/or a converter configured to convert the DC power supplied from the battery unit to the AC power to supply the AC power to the motor/generator unit or an external electrical grid based on control signals, or configured to convert the AC power supplied from the external electrical grid or the motor/generator unit to the DC power to charge the battery unit with the DC power based on the control signals.

11 Claims, 2 Drawing Sheets

(56) References Cited

U.S. PATENT DOCUMENTS

| | | | | |
|---|---|---|---|---|
| 2011/0169448 A1* | 7/2011 | Ichikawa | ............... | B60K 6/445 |
| | | | | 320/109 |
| 2011/0273139 A1* | 11/2011 | Hofheinz | .............. | B60L 3/0023 |
| | | | | 320/109 |
| 2011/0285349 A1* | 11/2011 | Widmer | ................ | B60L 11/182 |
| | | | | 320/108 |
| 2012/0032505 A1* | 2/2012 | Kusumi | ................ | B60L 11/123 |
| | | | | 307/10.1 |
| 2012/0062176 A1* | 3/2012 | Hasan | ....................... | B60L 7/14 |
| | | | | 320/109 |
| 2012/0176085 A1* | 7/2012 | Iida | ......................... | H02J 7/025 |
| | | | | 320/108 |
| 2013/0029595 A1* | 1/2013 | Widmer | ............... | H04B 5/0031 |
| | | | | 455/39 |
| 2014/0097697 A1* | 4/2014 | Cho | .......................... | G06F 1/26 |
| | | | | 307/104 |

FOREIGN PATENT DOCUMENTS

| | | |
|---|---|---|
| KR | 20110037523 A | 4/2011 |
| KR | 20120047100 A | 5/2012 |

\* cited by examiner

POWER TRANSMISSION APPARATUSES

CROSS-REFERENCE TO RELATED APPLICATION(S)

This application claims priority from Korean Patent Application No. 10-2012-0129096, filed on Nov. 14, 2012, in the Korean Intellectual Property Office (KIPO), the entire contents of which are incorporated herein by reference.

BACKGROUND

1. Field

Some example embodiments may relate to power transmission apparatuses that convert power and/or transmit power.

2. Description of Related Art

Power converting apparatuses such as inverters, converters, etc., are being utilized in various fields such as electric cars, industrial equipment, and consumer electronics. In addition, as a technology of power engineering such as smart grids, wireless power transmission, etc., develops, apparatuses that may efficiently convert and transmit different forms of power is required.

SUMMARY

Some example embodiments may provide apparatuses for transmitting power. The technical issues of the power transmission apparatuses may not be limited to the technical issues described above, but may include other technical issues.

In some example embodiments, a power transmission apparatus may comprise: a motor/generator unit configured to drive a motor with three-phase alternating current (AC) power converted from a supplied AC power or generating electrical power to supply AC power; a battery unit configured to charge electrical energy with direct current (DC) power and supplying the DC power by using the charged electrical energy; and/or a converter configured to convert the DC power supplied from the battery unit to the AC power to supply the AC power to the motor/generator unit or an external electrical grid based on control signals, or configured to convert the AC power supplied from the external electrical grid or the motor/generator unit to the DC power to charge the battery unit with the DC power based on the control signals.

In some example embodiments, a power transmission apparatus may further comprise a control unit configured to generate the control signals to control operations of the converter configured to convert the DC power to the AC power or the AC power to the DC power.

In some example embodiments, a power transmission apparatus may further comprise a switching unit including switches that are coupled to the battery unit, the external electrical grid, and the motor/generator unit, and configured to determine whether to transmit power to the battery unit, the external electrical grid, and the motor/generator unit by turning on/off the switches.

In some example embodiments, the switching unit may turn on/off each of the switches in response to the control signals.

In some example embodiments, the control unit may be configured to determine a frequency of power for each of the battery unit, the external electrical grid, and the motor/generator unit and may be configured to control on/off timing of a bidirectional switching device included in the converter according to the frequency. The converter may be configured to supply the power having the frequency to the battery unit, the external electrical grid, or the motor/generator unit according to the on/off timing of the bidirectional switching device.

In some example embodiments, the control unit may be configured to determine a type and magnitude of power for each of the battery unit, the external electrical grid, and/or the motor/generator unit, and/or may be configured to control a magnitude of a voltage and/or current applied to the converter according to the type and magnitude of the power.

In some example embodiments, the motor/generator unit may be configured to drive a motor/generator that is configured to convert electrical power to mechanical power by using a resonant tank and a resonant inverter and/or that is configured to generate electrical power by using mechanical power.

In some example embodiments, a power transmission apparatus may further comprise a wireless power transceiving unit configured to receive the power transmitted wirelessly from a wireless electrical grid. The wireless power transceiving unit may be configured to rectify and convert the wirelessly transmitted power into the AC power to be converted by the converter.

In some example embodiments, the switching unit may be configured to enable power to be transmitted to the motor/generator unit by turning on a switch coupled to the motor/generator unit and not to be transmitted to the external electrical grid by turning off a switch coupled to the external electrical grid, in response to the control signals.

In some example embodiments, the converter may be implemented by using a bidirectional switching device that is at least one of an insulated gate bipolar transistor (IGBT) and a field effect transistor (FET).

In some example embodiments, the power transmission apparatus may be configured to drive the motor/generator unit by using the electrical energy charged in the battery unit and may be configured to charge the battery unit with the AC power supplied from the external electrical grid, by using a bidirectional switching device included in the converter.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
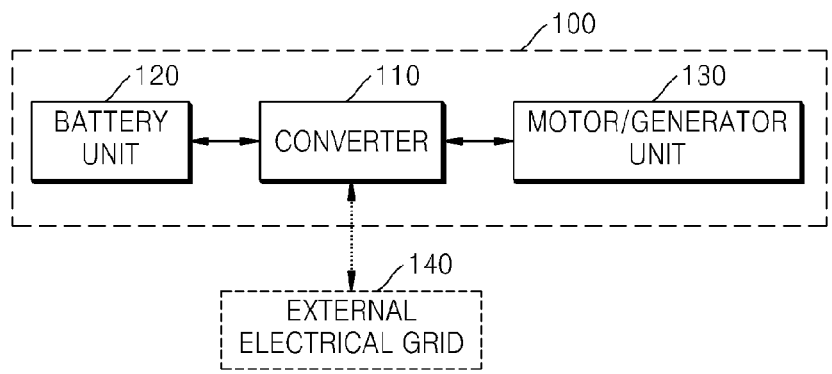
FIG. 1 is a block diagram illustrating a power transmission apparatus according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram illustrating a power transmission apparatus according to some example embodiments. Referring to FIG. 1, a power transmission apparatus 100 includes a converter 110, a battery unit 120, and a motor/generator unit 130.

The power transmission apparatus 100 illustrated in FIG. 1 illustrates only components associated with some example embodiments to prevent the characteristics of some example embodiments from becoming obscure. Thus, a person having ordinary skill in the art may understand that other general-purpose components besides the components illustrated in FIG. 1 may be further included.

The power transmission apparatus 100 illustrated in FIG. 1 may be a power transmission apparatus 100 for an electrical car, but not limited thereto. For the convenience of description, the power transmission apparatus 100 is described as the power transmission apparatus for the electrical car, but not limited thereto. Those skilled in the art may appreciate that the power transmission apparatus 100 may be used for all industrial equipment and consumer electronics that convert power among an external electrical grid 140, a motor/generator, and/or a battery, and/or transmit the converted power.

FIG. 1 illustrates a power transmission system that converts power between the battery unit 120 and the motor/generator unit 130 of the power transmission apparatus 100 and the external electrical grid 140 and transmits the converted power. The power transmission apparatus 100 may be included in an electrical car to transmit the electrical energy charged in the battery unit 120 or the power supplied from the external electrical grid 140, to the motor/generator unit 130, to charge the battery unit 120 by using the electric power generated from the motor/generator unit 130, or to supply electric power to the external electrical grid 140. In this case, the battery unit 120, the motor/generator unit 130, and the external electrical grid 140 correspond to a load system to which power converted by the converter 110 are supplied.

The converter 110 converts direct current (DC) power to alternating current (AC) power or vice versa. Thus, the power transmission apparatus 100 converts the DC power supplied from the battery unit 120 to AC power and supplies the converted AC power to the motor/generator unit 130 or the external electrical grid 140. And, the power transmission apparatus 100 converts the AC power supplied from the external electrical grid 140 or the motor/generator unit 130 to DC power and uses them for charging the battery unit 120. The power transmission apparatus 100 may convert, with one converter 110, based on controls signals. For example, the converter 110 may be implemented with a bidirectional switching device such as an insulated gate bipolar transistor (IGBT), a field effect transistor (FET), etc.

The converter 110 converts DC or AC power to power having forms and magnitudes that the load system requires. A form and magnitude of power used for charging batteries at the battery unit 120 are different from those of power used for driving a motor at the motor/generator unit 130. Thus, the converter 110 converts a supplied power to power having a form and magnitude required when charging the battery unit 120, supplying power from the battery unit 120, driving a motor of the motor/generator unit 130, and generating power at the motor/generator unit 130, respectively.

If a converter that converts the power supplied by the external electrical grid 140 to the power used for charging a battery of the battery unit 120 and a converter that converts the electrical energy charged in the battery unit 120 to the power used for driving a motor of the motor/generator unit 130 are used separately, the entire volume and weight of the power transmission apparatus may increase. Thus, the power transmission apparatus 100 converts the supplied power to power having a form and magnitude required when charging the battery unit 120, supplying power from the battery unit 120, driving a motor of the motor/generator unit 130, and generating power at the motor/generator unit 130, respectively, with one converter 110, thus the power transmission apparatus 100 may efficiently convert and transmit power at a low cost.

The battery unit 120 charges electrical energy with DC power and supplies DC power by using the charged electrical energy. The AC power supplied by the external electrical grid 140 or the AC power obtained from the electric power generated by the motor/generator unit 130 should be converted to DC power and supplied to the battery unit 120. In addition, when power is supplied due to the discharge of the battery unit 120, it is supplied in the form of DC power. The battery unit 120 may include a battery (not illustrated) and a charge circuit (not illustrated) required for charging the battery.

The motor/generator unit 130 drives a motor with three-phase AC power converted from supplied AC power or generates electrical power to supply the AC power. The motor/generator unit 130 may include a motor/generator (not illustrated) and a resonant unit (not illustrated) that converts the supplied power to the power required for the motor/generator and operates the motor/generator. In this case, the resonant unit may include a resonant tank or a resonant inverter so as to supply a three-phase AC power with frequencies required for driving the motor of the motor/generator. However, example embodiments are not limited thereto but may include various devices for converting the supplied power to the power required for the motor/generator.

The motor/generator converts electrical power to mechanical power or generates electrical power by using mechanical power. That is, the motor/generator unit 130 provides the converted power required for a motor by using the electrical power transmitted from the converter 110 so that the motor/generator may operate as a motor that provides mechanical power such as rotation to a coupled load. Alternatively, the motor/generator unit 130 may generate electrical power by the mechanical power such as rotation of the coupled load so that it may operate as a generator that transmits the generated electrical power.

Since the motor/generator unit 130 is driven by AC power, it needs to convert DC power to AC power if the DC power is supplied from the battery unit 120. Thus, the converter 110 converts the DC power of the battery unit 120 to AC power to supply the converted DC power to the motor/generator unit 130. In addition, in order for the motor/generator to drive a motor, it needs to supply a three-phase AC power with frequencies required for driving the motor. Thus, in the resonant unit of the motor/generator unit 130, the AC power from the converter 110 is converted to a three-phase AC power with frequencies for driving the motor to supply the three-phase AC power to the motor/generator.

Thus, the power transmission apparatus 100 may charge the battery of the battery unit 120 by using the AC power supplied from the external electrical grid 140 or drive the motor of the motor/generator unit 130 by using the electrical energy charged in the battery by using one converter 110 so that power is efficiently converted and transmitted at a low cost.

Figure 2:
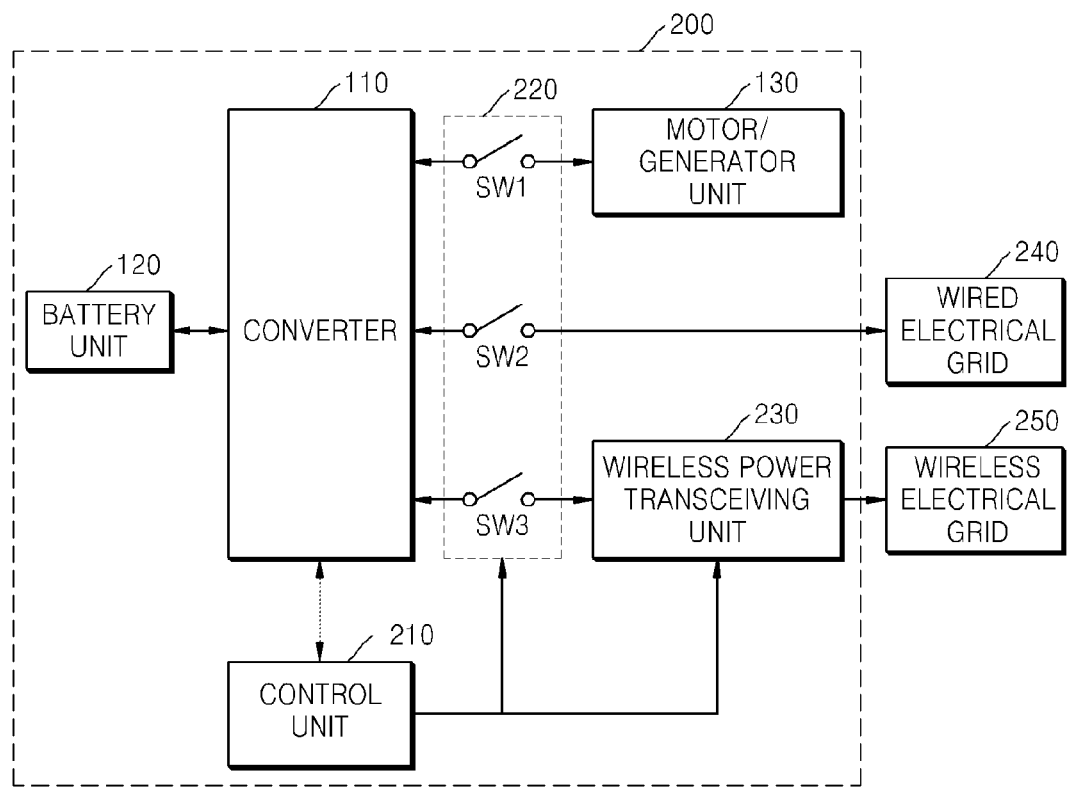
FIG. 2 is a block diagram illustrating a power transmission apparatus according to some example embodiments.

FIG. 2 is a block diagram illustrating a power transmission apparatus according to some example embodiments. Referring to FIG. 2, the power transmission apparatus 200 includes a converter 110, a battery unit 120, a motor/generator unit 130, a control unit 210, a switching unit 220, and a wireless power transceiving unit 230.

The power transmission apparatus 200 illustrated in FIG. 2 includes only components related to some example embodiments to prevent the characteristics of some example embodiments from becoming obscure. Thus, those skilled in the art may understand that other general-purpose components besides the components illustrated in FIG. 2 may be further included.

The converter 110, the battery unit 120, and the motor/generator unit 130 that are illustrated in FIG. 2 correspond to those illustrated in FIG. 1. Thus, since the descriptions made in relation to the converter 110, the battery unit 120, and the motor/generator unit 130 of FIG. 1 may be applicable to those illustrated in FIG. 2, the descriptions are not repeated. A wired electrical grid 240 and a wireless electrical grid 250 that are illustrated in FIG. 2 correspond to the external electrical grid 140 illustrated in FIG. 1.

In the power transmission apparatus 200 illustrated in FIG. 2, the converter 110 may convert and transmit the power supplied from the wired electrical grid 240 or the wireless electrical grid 250 to the power necessary for the motor/generator unit 130 or the battery unit 120, or convert and transmit the electrical energy charged in the battery unit 120 to the power necessary for the motor/generator unit 130, the wired electrical grid 240, or the wireless electrical grid 250. In addition, the converter 110 may convert and transmit the electrical power generated from the motor/generator unit 130 to the power necessary for the battery unit 120, the wired electrical grid 240, or the wireless electrical grid 250. In this case the battery unit 120, the motor/generator unit 130, the wired electrical grid 240, and the wireless electrical grid 250 may correspond to a load system to which the power converted by the converter 110 is supplied.

The control unit 210 controls the converter 110 to convert the DC power supplied from the battery unit 120 to AC power to be supplied to the wired electrical grid 240, the wireless electrical grid 250, or the motor/generator unit 130, or to convert the AC power supplied from the wired electrical grid 240, the wireless electrical grid 250, or the motor/generator unit 130 to DC power to be supplied to the battery unit 120. The control unit 210 transmits control signals to the converter 110 and controls the converter 110 so that the converter 110 converts a supplied power to power having a form, magnitude, and frequency that each load system needs.

In this case, the frequency of power that the wired electrical grid 240, the wireless electrical grid 250, or the motor/generator unit 130 needs has different frequency bands. Thus, the control unit 210 may determine the frequency of power that each load system needs so that the converter 110 converts to the power having the determined frequency. For example, the control unit 210 may control the on/off timing of a bidirectional switching device (not illustrated) included in the converter 110 so that the converter 110 converts the supplied power to power with a frequency that each load system needs. The converter 110 supplies the converted power having the determined frequency, to the battery unit 120, the wired electrical grid 240, the wireless electrical grid 250, or the motor/generator unit 130, according to the on/off timing of the bidirectional switching device.

In addition, the control unit 210 may determine the form and magnitude of power that each load system needs so that the converter 110 converts to power having the determined form and magnitude of power. For example, the control unit 210 may control the magnitude of the voltage or current applied to the converter 110 so that the converter 110 converts the supplied power to power having a form and a magnitude that each load system needs.

For example, if the power transmission apparatus 200 wants to drive the motor of the motor/generator unit 130 by using the electrical energy of the battery unit 120, the control unit 210 determines the form, magnitude, and frequency of power necessary for the motor/generator unit 130 and transmits control signals based on the determined form, magnitude, and frequency of power to the converter 110. Since the operation of the converter 110 is controlled in response to the received control signals, the converter 110 may receive a DC power from the battery unit 120, convert it to AC power with a magnitude and frequency necessary for the motor/generator unit 130, and supply the converted power.

In addition, the control unit 210 controls the switching unit 220 that determines whether to transmit power to each load system. The control unit 210 transmits control signals to the switching unit 220 to control connection between the converter 110 and each load system. Since the switching unit 220 includes one or more switches, the control unit 210 determines the on/off state of each switch coupled to each load system to control the connection between the converter 110 and each load system.

For example, if the power transmission apparatus 200 wants to drive the motor of the motor/generator unit 130 by using the electrical energy of the battery unit 120, the control unit 210 transmits control signals to the switching unit 220 to determine the on/off state of each switch. That is, the control unit 210 transmits control signals to the switching unit 220 so that a first switch SW1 coupled to the motor/generator unit 130 is in an on state, a second switch SW2 coupled to the wired electrical grid 240 is in an off state, and a third switch SW3 coupled to the wireless electrical grid 250 is in an off state. Thus, the control unit 210 may control the power transmission apparatus 200 so that the AC power converted from DC power supplied from the battery unit 120 are transmitted only to the motor/generator unit 130 without being transmitted to the wired electrical grid 240 and the wireless electrical grid 250.

The control unit 210 according to some example embodiments may correspond to or include at least one processor. Thus, the control unit 210 may be incorporated and driven into another hardware device such as a microprocessor or a general-purpose computer system.

The switching unit 220 determines whether to transmit power to each load system coupled to the converter 110 according to the control signals from the control unit 210. The switching unit 220 includes one or more switches. The switching unit 220 may determine whether to transmit power to each load system by turning on/off the switch coupled to each load system according to the control signals. The switching unit 220 turns on a switch to transmit power to the coupled load system according to the determination of the control unit 210 or turns off a switch not to transmit power to the coupled load system.

For example, the first switch SW1 is coupled to the motor/generator unit 130 and turns on/off depending on whether to transmit power to the motor/generator unit 130 that is determined by the control unit 210. The second switch SW2 is coupled to the wired electrical grid 240 and turns on/off depending on whether to transmit power to the wired electrical grid 240 that is determined by the control unit 210. The third switch SW3 is coupled to the wireless electrical grid 250 and turns on/off depending on whether to transmit power to the wireless electrical grid 250 that is determined by the control unit 210.

As another example, when the power transmission apparatus 200 receives power from the wireless electrical grid 250 and wants to charge the battery of the battery unit 120, the control unit 210 transmits control signals to the switching unit 220, the switching unit 220 turns on the third switch SW3 coupled to the wireless power transceiving unit 230 according to the control signals so that the wireless power transceiving unit 230 receiving power from the wireless electrical grid 250 transmits power. In addition, the switching unit 220 turns off the other switches, namely, the second switch SW2 coupled to the wired electrical grid 240 and the first switch SW1 coupled to the motor/generator unit 130. Thus, in the power transmission apparatus 200, the power supplied from the wireless electrical grid 250 may be converted by the converter 110 to charge the battery of the battery unit 120.

The wireless power transceiving unit 230 receives the power transmitted wirelessly from the wireless electrical grid 250, rectifies and converts the transmitted power to be able to be converted by the converter 110. Alternatively, the wireless power transceiving unit 230 converts the power converted by the converter 110 to be suitable for wireless power transmission and transmits the converted power so that the power converted by the converter 110 is transmitted to the wireless electrical grid 250 wirelessly. It may be appreciated that the wireless power transceiving unit 230 according to some example embodiments may transmit power in various wireless power transmission manners.

Thus, the power transmission apparatus 200 may charge the battery of the battery unit 120 by using the AC power(s) supplied from the wired electrical grid 240 or the wireless electrical grid 250 in a wired manner or wirelessly or drive the motor of the motor/generator unit 130 by using the electrical energy charged in the battery by using one converter 110 so that power may be efficiently converted and transmitted at a low cost.

Figure 3:
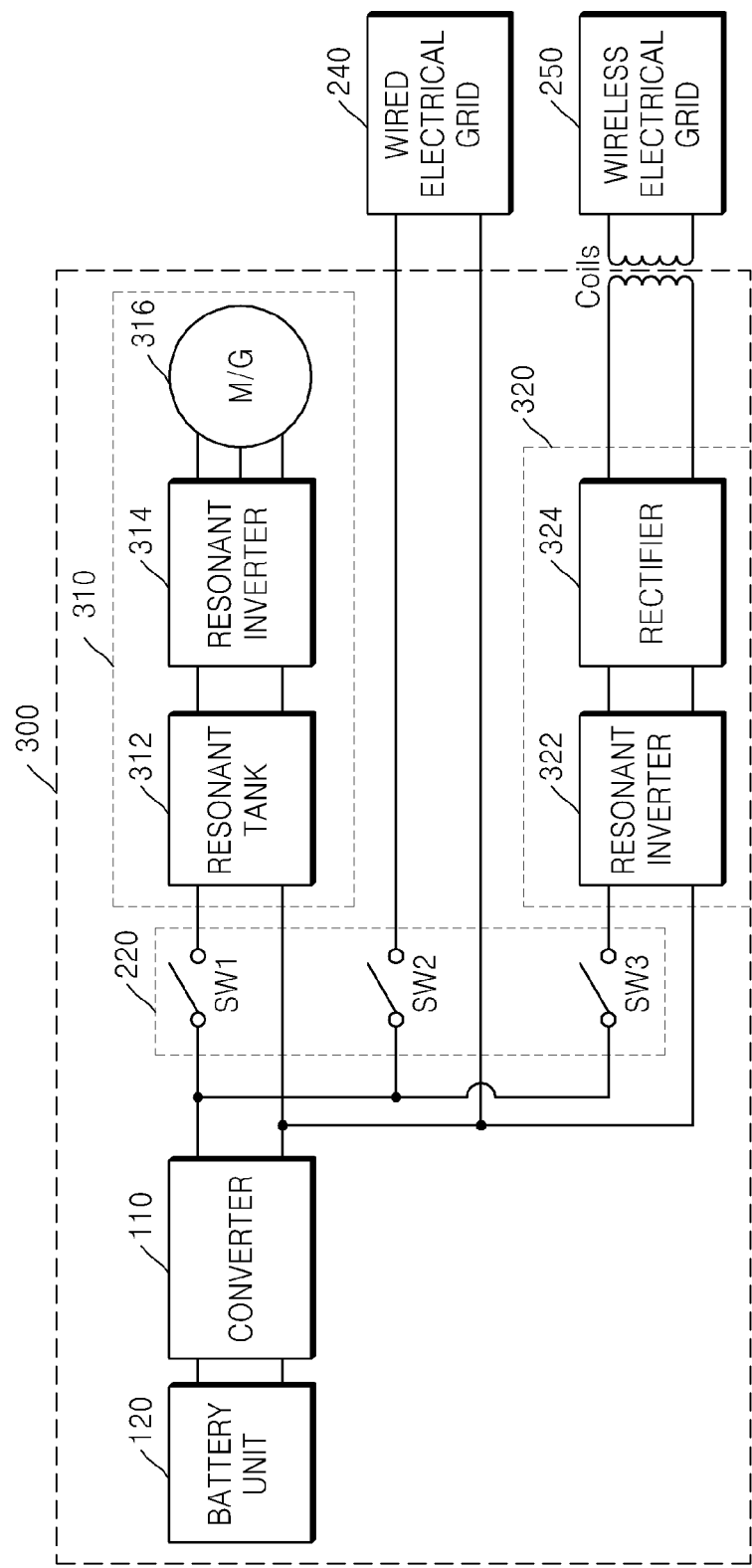
FIG. 3 is a block diagram illustrating a power transmission apparatus according to some example embodiments.

FIG. 3 is a block diagram illustrating a power transmission apparatus according to some example embodiments. Referring to FIG. 3, the power transmission apparatus 300 includes a converter 110, a battery unit 120, a motor/generator unit 310, a switching unit 220, and a wireless power transceiving unit 320. The motor/generator unit 310 includes a resonant tank 312, a resonant inverter 314, and a motor/generator (M/G) 316, and the wireless power transceiving unit 320 includes a resonant inverter 322 and a rectifier 324.

The power transmission apparatus 300 illustrated in FIG. 3 includes only components related to some example embodiments to prevent the characteristics of some example embodiments from becoming obscure. Thus, those skilled in the art may understand that other general-purpose components besides the components illustrated in FIG. 3 may be further included.

The converter 110, the battery unit 120, and the switching unit 220 illustrated in FIG. 3 correspond to those illustrated FIGS. 1 to 2. Thus, since the descriptions made in relation to the converter 110, the battery unit 120, and the switching unit 220 of FIGS. 1 to 2 may be applicable to those of FIG. 3, the descriptions are not repeated. In addition, the wired electrical grid 240 and the wireless electrical grid 250 that are illustrated in FIG. 3 correspond to those illustrated in FIG. 2.

In the power transmission apparatus 300 illustrated in FIG. 3, the converter 110 may convert and transmit the power supplied from the wired electrical grid 240 or the wireless electrical grid 250 to power necessary for the motor/generator unit 130 or the battery unit 120, or convert and transmit the electrical energy charged in the battery unit 120 to power necessary for the wired electrical grid 240 or the wireless electrical grid 250. In this case, the battery unit 120, the motor/generator unit 130, the wired electrical grid 240, and the wireless electrical grid 250 may correspond to a load system to which the power converted by the converter is supplied.

The motor/generator unit 310 converts supplied AC power to three-phase AC power to drive a motor or generates electrical power to supply AC power. The motor/generator unit 310 may include a resonant tank 312, a resonant inverter 314, and a motor/generator 316. The motor/generator unit 310 illustrated in FIG. 3 may be an example embodiment of the motor/generator unit 130 illustrated in FIGS. 1 to 2 and is not limited thereto.

The resonant tank 312 stores resonant energy for supplying a three-phase AC power with a frequency required for driving the motor of the motor/generator 316. For example, the resonant tank 312 may be, but not limited to, an inductive-capacitive (LC) resonant tank.

The resonant inverter 314 converts the resonant energy stored in the resonant tank to a three-phase AC power with a frequency required for driving the motor of the motor/generator 316. Thus, the motor/generator unit 310 may use the resonant tank 312 and the resonant inverter 314 to convert the AC power converted by the converter 110 to three-phase AC power with a frequency for driving a motor to supply the three-phase AC power to the motor/generator 316.

The motor/generator 316 converts electrical power to mechanical power or generates electrical power by using mechanical power. The motor/generator unit 310 drives a motor by using the electrical power transmitted from the converter 110 so that the motor/generator 316 may operate as a motor that provides mechanical power such as rotation to a load. Alternatively, the motor/generator unit 310 may generate electrical power by using the mechanical power such as rotation of the load so that the motor/generator 316 may also operate as a generator that transmits the generated electrical power.

The wireless power transceiving unit 320 receives the power transmitted wirelessly from the wireless electrical grid 250. The wireless power transceiving unit 320 may include the resonant inverter 322 and the rectifier 324. The wireless power transceiving unit 320 illustrated in FIG. 3 may be an example embodiment of the wireless power transceiving unit 230 illustrated in FIG. 2 and is not limited thereto, and those skilled in the art may appreciate that the wireless power transceiving unit 320 may transmit power in other various wireless power transmitting manner.

The rectifier 324 rectifies the transmitted power so that the power transmitted through coils Coils from the wireless electrical grid 250 may be converted by the converter 110.

The resonant inverter 322 converts the power rectified by the rectifier 324 to power that may be converted by the converter 110.

Thus, in the power transmission apparatus 300, the converter 110 may charge the battery of the battery unit 120 with the AC power supplied from the external electrical grid 140 or drive the motor of the motor/generator unit 130 by using the electrical energy charged in the battery so that power are efficiently converted and transmitted at a low cost.

While example embodiments have been particularly shown and described, it will be understood by those of ordinary skill in the art that various changes in form and details may be made therein without departing from the spirit and scope of the present invention as defined by the following claims.

What is claimed is:

1. A power transmission apparatus, comprising:
a motor/generator unit configured to drive a motor with three-phase alternating current (AC) power converted from a supplied AC power or generating electrical power to supply AC power;
a battery unit configured to store electrical energy by being charged with direct current (DC) power and supplying the DC power;
a converter configured to convert the DC power supplied from the battery unit to the AC power to supply the AC power to the motor/generator unit or an external electrical grid, including a wired electrical grid and a wireless electrical grid, based on control signals, or configured to convert the AC power supplied from the external electrical grid or the motor/generator unit to the DC power to charge the battery unit with the DC power based on the control signals;
a wireless power transceiving unit configured to receive wireless power transmitted through coils from the wireless electrical grid; and
a control unit configured to determine a frequency of power for each of the battery unit, the external electrical grid, and the motor/generator unit and is configured to control on/off timing of a bidirectional switching device included in the converter according to the frequency.

2. The apparatus of claim 1,
wherein the control unit is configured to generate the control signals to control operations of the converter configured to convert the DC power to the AC power or the AC power to the DC power.

3. The apparatus of claim 1, further comprising:
a switching unit including switches that are coupled to the battery unit, the external electrical grid, and the motor/generator unit, and configured to determine whether to transmit power to the battery unit, the external electrical grid, and the motor/generator unit by turning on/off the switches.

4. The apparatus of claim 3, wherein the switching unit turns on/off each of the switches in response to the control signals.

5. The apparatus of claim 1,
wherein the converter is configured to supply the power having the frequency to the battery unit, the external electrical grid, or the motor/generator unit according to the on/off timing of the bidirectional switching device.

6. The apparatus of claim 1, wherein the control unit is configured to determine a type and magnitude of power for each of the battery unit, the external electrical grid, and the motor/generator unit, and is configured to control a magnitude of a voltage or current applied to the converter according to the type and magnitude of the power.

7. The apparatus of claim 1, wherein the motor/generator unit is configured to drive a motor/generator that is configured to convert electrical power to mechanical power by using a resonant tank and a resonant inverter or that is configured to generate electrical power by using mechanical power.

8. The apparatus of claim 1, wherein the wireless power transceiving unit is configured to rectify and convert the transmitted wireless power into the AC power to be converted by the converter.

9. The apparatus of claim 3, wherein the switching unit is configured to enable power to be transmitted to the motor/generator unit by turning on a switch coupled to the motor/generator unit and not to be transmitted to the external electrical grid by turning off a switch coupled to the external electrical grid, in response to the control signals.

10. The apparatus of claim 1, wherein the converter is implemented by using a bidirectional switching device that is at least one of an insulated gate bipolar transistor (IGBT) and a field effect transistor (FET).

11. The apparatus of claim 1, wherein the power transmission apparatus is configured to drive the motor/generator unit by using the electrical energy stored in the battery unit and is configured to charge the battery unit with the AC power supplied from the external electrical grid, by using a bidirectional switching device included in the converter.

* * * * *